UNITED STATES PATENT OFFICE.

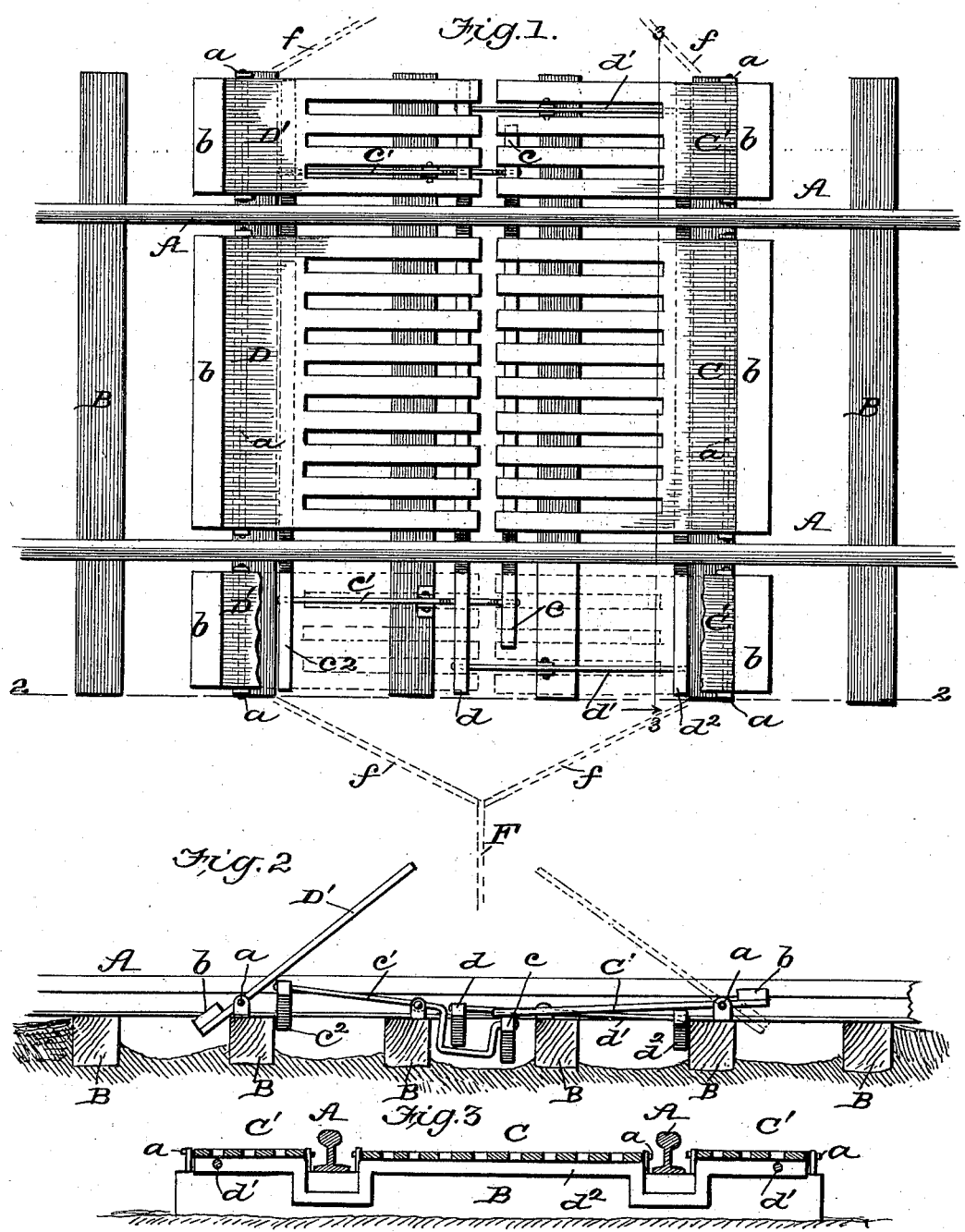

ROBERT F. ADAMS, OF HORSECREEK, ALABAMA.

RAILROAD CATTLE-GUARD.

SPECIFICATION forming part of Letters Patent No. 653,128, dated July 3, 1900.

Application filed September 29, 1899. Serial No. 732,058. (No model.)

*To all whom it may concern:*

Be it known that I, ROBERT FRANKLIN ADAMS, of Horsecreek, in the county of Walker and State of Alabama, have invented a new and useful Improvement in Railroad Cattle-Guards, of which the following is a specification.

My invention relates to a novel construction of cattle-guard designed to be placed along the line of a railroad-track at the abutting ends of a division-fence where a break in its continuity must necessarily occur in order to give passage to the railway-tracks; and it consists in the peculiar construction and arrangement of gates arranged to be automatically operated by the animal in any effort to cross the same, as will be hereinafter more fully described with reference to the drawings, in which—

Figure 1 is a plan view, and Fig. 2 is a vertical longitudinal section on line 2 2 of Fig. 1, and Fig. 3 a vertical transverse section on line 3 3 of Fig. 1.

In the drawings, A A represent the rails, which are laid on cross-ties B in the usual way. These cross-ties are bedded upon the earth, which latter does not require to be excavated to the dimensions of a pit, as is usual in cattle-guard gates.

C C' C' and D D' D' are six gates which normally occupy a horizontal position below the level of the rails, but not below the ties. These two series of gates are arranged close by and opposite to each other, so as to stop the passage of the cattle going in either direction along the track. The middle and larger gates C and D are arranged between the rails and the smaller ones C' C' and D' D' are arranged outside the rails on opposite sides of the middle ones. The two series of gates are constructed and arranged exactly alike, and the partition-fence F preferably has at its ends divergent branches that extend to the outer edges of the double gate, as shown at $f\ f$.

The gates are of slatted or solid construction, built of materials strong enough to bear the weight of the cattle without being damaged, and they are all pivoted or hinged on a horizontal axis on the cross-tie near their outer ends at $a$ and are weighted at $b$, just outside their axes, so as to nearly balance the weights of their inner projecting ends, whereby they are maintained in a condition of sensitive equilibrium, so as to be easily worked by the weight of a small animal as well as a large one. Under these gates there are sets of longitudinally-arranged levers and transversely-arranged lift-bars. The free inner ends of the series of gates C C' C' bear upon a depressible cross-bar $c$, that is attached to the short ends of two longitudinally-arranged levers $c'\ c'$, whose long ends are attached to the cross-bar $c^2$, located beneath the series of gates D D' D' near their fulcrum, so that when any one of the gates C C' C' is pressed upon inside its fulcrum these subjacent cross-bars and levers will cause the series of gates D D' D' to be thrown up in front of the animal, as shown in full lines, and constitute a barrier to further progress and so intimidate the animal as to cause it to back out at once. The other series of gates D D' D' are reciprocally arranged to throw up the gates C C' C' by a similar mechanism—that is to say, under the free inner ends of the series of gates D D' D' is arranged a depressible cross-bar $d$, connected to the short ends of two longitudinally-arranged levers $d'\ d'$, which in turn carry at their long ends a cross-bar $d^2$, that lies under the series of gates C C' C' near their fulcrum and which are worked to throw up the gates C C' C' by the depression of the gates D D' D' in a similar manner. If the animal steps on either series of gates on its extreme outer edge, outside its fulcrum, then the gate stepped on will itself rise immediately in front of the face of the animal and deter it from advancing farther, as shown in dotted lines, Fig. 2. The cross-bars, it will be understood, are so bent with U-shaped depressions as to accommodate them to the position of the rails, as shown in Fig. 3. With this device an effective, simple, and automatically-operated gate is provided which requires no pit and only needs a part of the earth to be removed from between some of the ties.

The gates may be made of any length, but are preferably five feet long and are arranged to rise from three to four feet. In fencing cuts or at road-crossings where the railroad is fenced only one lever is necessary, as the stock is only to be kept from going one way.

The gates are to be made of two-inch plank or sheet-iron, and the levers are iron bars three-fourths of an inch by two inches or round rods seven-eighths of an inch in cross-section.

These cattle-guards can be made and put on the road for use at a very low cost.

Having thus described my invention, what I claim as new, and desire to secure by Letters Patent, is—

1. Two gates fulcrumed at their outer ends and facing inwardly toward each other and connecting mechanism whereby the descent of the inner end of one gate raises the inner end of the other gate substantially as described.

2. A cattle-guard consisting of two oppositely-facing gates arranged horizontally along a railroad-track, and hinged upon axes transverse to the rails near their outer ends and levers arranged beneath the inner end of one gate and the inner end of the opposite gate substantially as described whereby when one gate is stepped upon at its outer end it raises that gate and when stepped upon on the inner end it raises the opposite one as described.

3. A cattle-guard consisting of two oppositely-facing gates arranged horizontally along a railroad-track and hinged upon axes transverse to the rails, a cross-bar lying under the free end of one gate, another cross-bar arranged near the fulcrum of the opposite gate and levers connecting the two to cause the depression of one gate to raise the oppositely-facing one substantially as and for the purpose described.

In testimony whereof I have signed my name to this specification in the presence of two subscribing witnesses.

ROBERT F. ADAMS.

Witnesses:
R. H. PALMER,
R. F. WYATT.